US011555523B2

(12) United States Patent
Lee

(10) Patent No.: US 11,555,523 B2
(45) Date of Patent: Jan. 17, 2023

(54) FOUR-MODE ROCKER CLUTCH

(71) Applicant: Schaeffler Technologies AG & Co. KG, Herzogenaurach (DE)

(72) Inventor: Brian Lee, York, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 25 days.

(21) Appl. No.: 17/160,576

(22) Filed: Jan. 28, 2021

(65) Prior Publication Data

US 2022/0235830 A1 Jul. 28, 2022

(51) Int. Cl.
*F16D 41/16* (2006.01)
*F16D 41/14* (2006.01)

(52) U.S. Cl.
CPC .......... *F16D 41/16* (2013.01); *F16D 41/14* (2013.01)

(58) Field of Classification Search
CPC ......... F16D 41/12–16; F16D 27/00–14; F16D 28/00
See application file for complete search history.

(56) References Cited

U.S. PATENT DOCUMENTS

| 10,859,125 | B2 * | 12/2020 | Cioc | F16D 41/14 |
| 11,215,243 | B2 * | 1/2022 | Hodge | F16D 41/16 |
| 11,215,245 | B2 * | 1/2022 | Kimes | F16D 41/04 |
| 11,261,922 | B2 * | 3/2022 | Burke | F16D 41/12 |
| 2019/0226533 | A1 * | 7/2019 | Cioc | F16D 27/118 |
| 2019/0264760 | A1 | 8/2019 | Peglowski et al. | |
| 2020/0240480 | A1 | 7/2020 | Hodge et al. | |
| 2020/0248762 | A1 | 8/2020 | Burke | |
| 2021/0054886 | A1 * | 2/2021 | Burke | F16D 41/12 |
| 2021/0102586 | A1 * | 4/2021 | Hodge | F16D 41/16 |
| 2021/0164526 | A1 * | 6/2021 | Kimes | F16D 48/06 |
| 2022/0112926 | A1 * | 4/2022 | Lee | F16D 41/084 |

FOREIGN PATENT DOCUMENTS

| CN | 111120542 A | 5/2020 |
| WO | 2019153069 A1 | 8/2019 |

OTHER PUBLICATIONS

International Search Report and Written Opinion dated Apr. 27, 2022, in International Application No. PCT/US2022/011213.

* cited by examiner

*Primary Examiner* — David R Morris
(74) *Attorney, Agent, or Firm* — Volpe Koenig

(57) ABSTRACT

A four-mode rocker clutch, including: a clutch gear supported for rotation around an axis of rotation; a housing; a first pawl including a portion disposed within the housing; a first actuator; a second pawl including a portion disposed within the housing; and a first resilient element. For a first one-way mode of the four-mode rocker clutch: the first actuator is arranged to hold the first pawl in contact with the clutch gear; the first pawl is arranged to block rotation of the clutch gear, with respect to the housing, in a first circumferential direction around an axis of rotation; and the first resilient element is arranged to hold the second pawl out of contact with the clutch gear.

20 Claims, 14 Drawing Sheets

FOUR-MODE ROCKER CLUTCH

TECHNICAL FIELD

The present disclosure relates to a four-mode rocker clutch.

BACKGROUND

Known ratcheting clutch can lack desired functionality.

SUMMARY

According to aspects illustrated herein, there is provided a four-mode rocker clutch, including: a clutch gear supported for rotation around an axis of rotation; a housing; a first pawl including a portion disposed within the housing; a first actuator; a second pawl including a portion disposed within the housing; and a first resilient element. For a first one-way mode of the four-mode rocker clutch: the first actuator is arranged to hold the first pawl in contact with the clutch gear; the first pawl is arranged to block rotation of the clutch gear, with respect to the housing, in a first circumferential direction around an axis of rotation; and the first resilient element is arranged to hold the second pawl out of contact with the clutch gear.

According to aspects illustrated herein, there is provided a four-mode rocker clutch, including: a clutch gear supported for rotation around an axis of rotation; a housing; a first pawl including a first portion disposed within the housing; a first actuator; a first resilient element; a second pawl including a second portion disposed within the housing; a second actuator; and a second resilient element. For a first one-way mode of the four-mode rocker clutch: the first actuator is arranged to hold the first pawl in contact with the clutch gear; the first pawl is arranged to block rotation of the clutch gear, with respect to the housing, in a first circumferential direction; and the first resilient element is arranged to hold the second pawl out of contact with the clutch gear. To shift to a second one-way mode of the four-mode rocker clutch: the second actuator is arranged to pivot the second pawl into contact with the clutch gear; the second pawl is arranged to block rotation of the clutch gear, with respect to the housing, in a second circumferential direction, opposite the first circumferential direction; and the second resilient element is arranged to pivot the first pawl out of contact with the clutch gear.

According to aspects illustrated herein, there is provided a method of operating a four-mode rocker clutch including a housing, a clutch gear, a first pawl with a portion within the housing, and a second pawl with a portion within the housing. The method includes: holding, with a first resilient element, the first pawl out of contact with the clutch gear; holding, with a first actuator, the second pawl in contact with the clutch gear; blocking, with the second pawl, rotation of the clutch gear, with respect to the housing, in a first circumferential direction around an axis of rotation; rotating the clutch gear, with respect to the housing, in a second circumferential direction, opposite the first circumferential direction; pivoting, with a second resilient element, the second pawl out of contact with the clutch gear; pivoting with a second actuator, the first pawl into contact with the clutch gear; rotating the clutch gear, with respect to the housing, in the second circumferential direction; and blocking, with the first pawl, rotation of the clutch gear, with respect to the housing, in the second circumferential direction.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
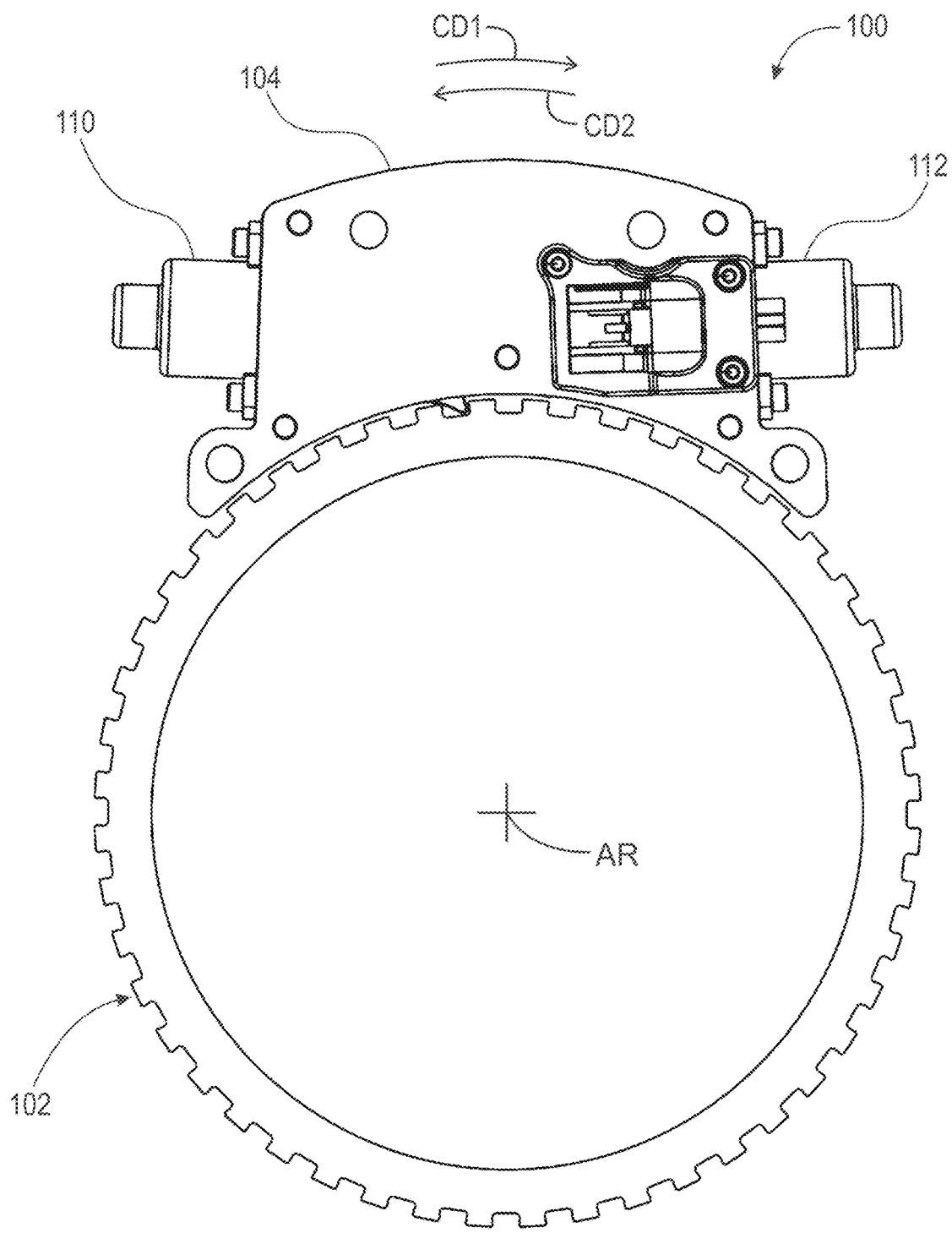
FIG. 1 is a front view of a four-mode rocker clutch in a clock-wise one-way mode.

FIG. 1 is a front view of four-mode rocker clutch 100 in a clock-wise one-way mode.

Figure 2:
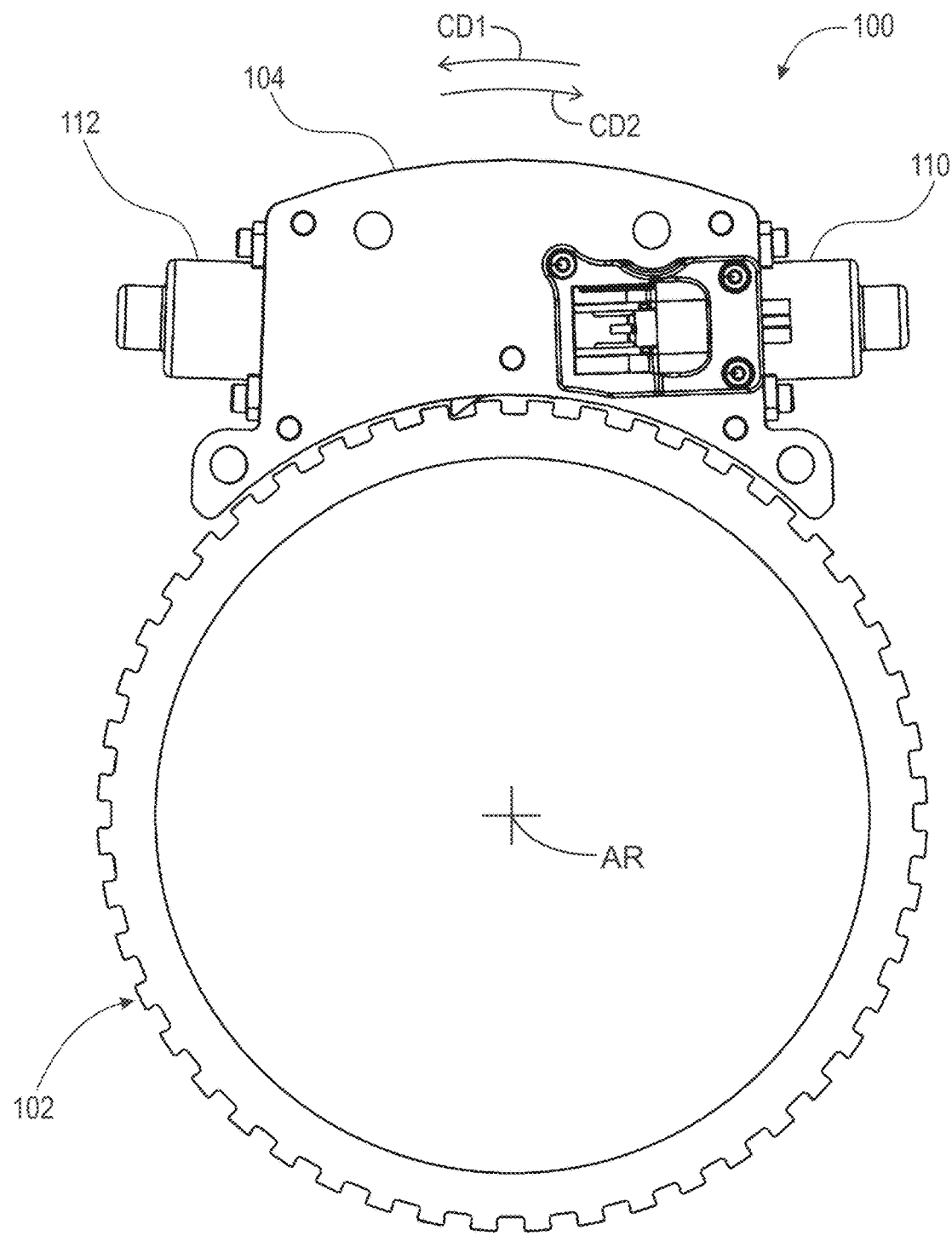
FIG. 2 is a rear view of the four-mode rocker clutch shown in FIG. 1.

FIG. 2 is a rear view of four-mode rocker clutch 100 shown in FIG. 1.

Figure 3:
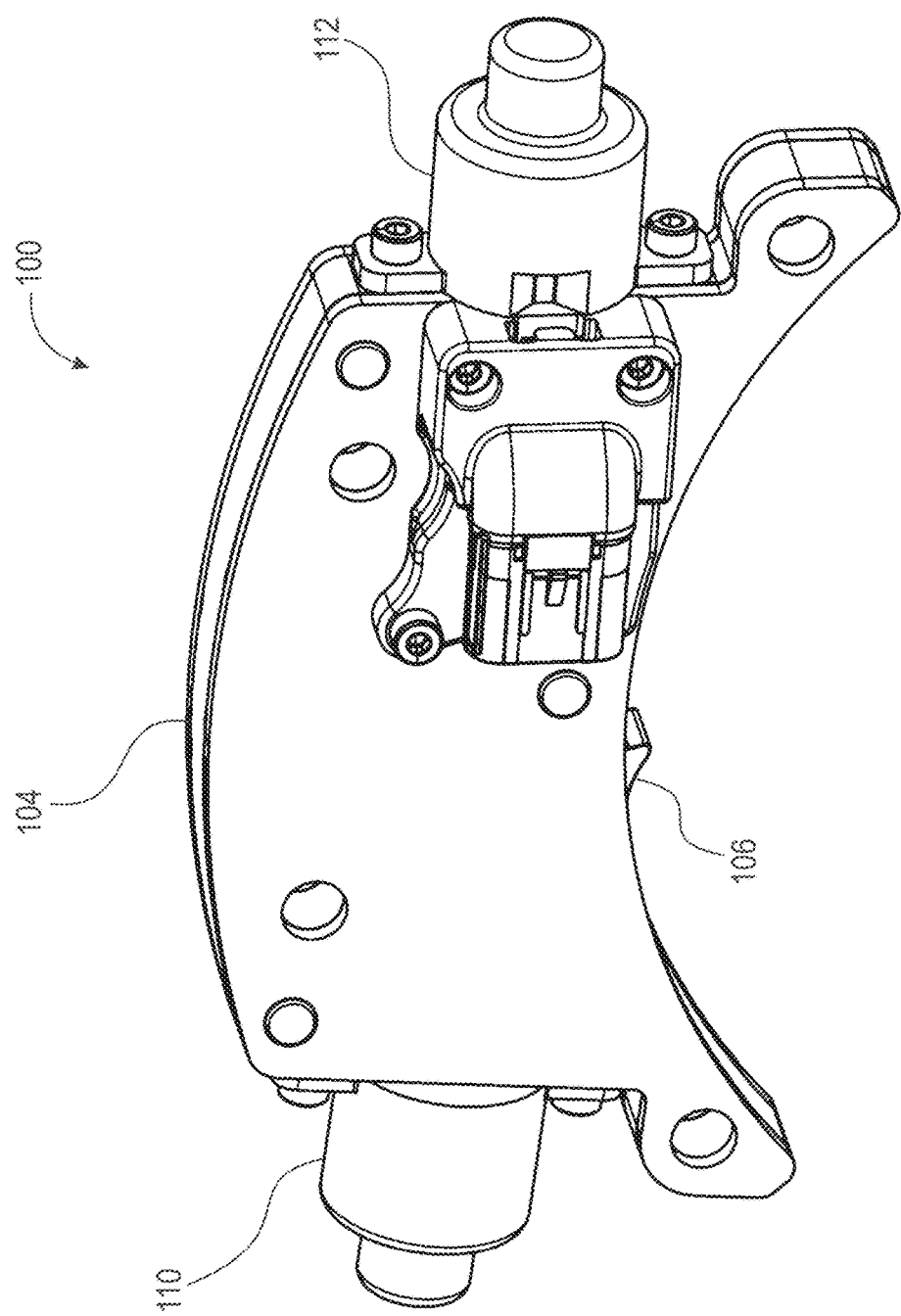
FIG. 3 is a front isometric view of the four-mode rocker clutch shown in FIG. 1 with a clutch gear removed.

FIG. 3 is a front isometric view of four-mode rocker clutch 100 shown in FIG. 1 with a clutch gear removed.

Figure 4:
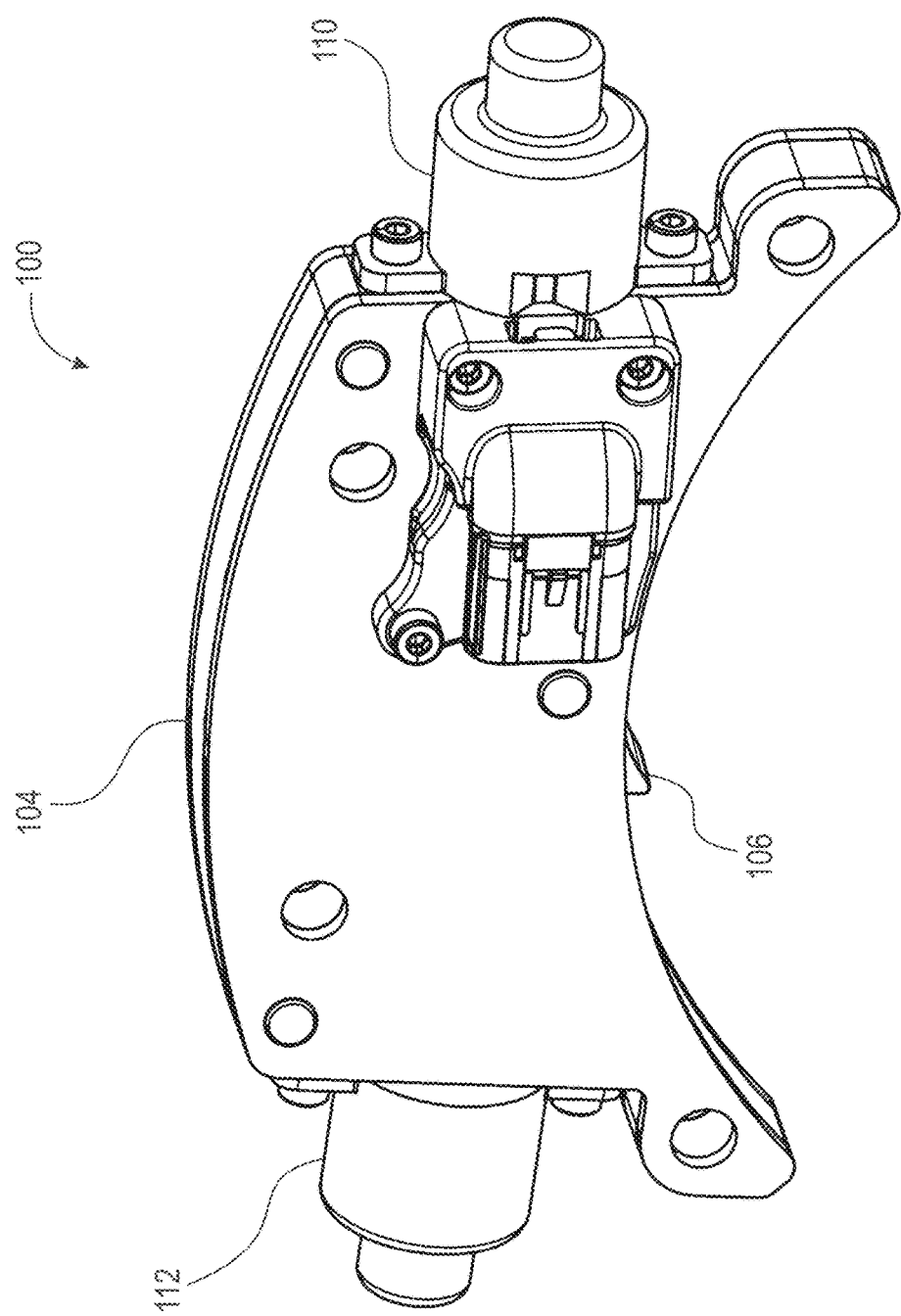
FIG. 4 is a rear isometric view of the four-mode rocker clutch shown in FIG. 3.

FIG. 4 is a rear isometric view of four-mode rocker clutch 100 shown in FIG. 3.

Figure 5:
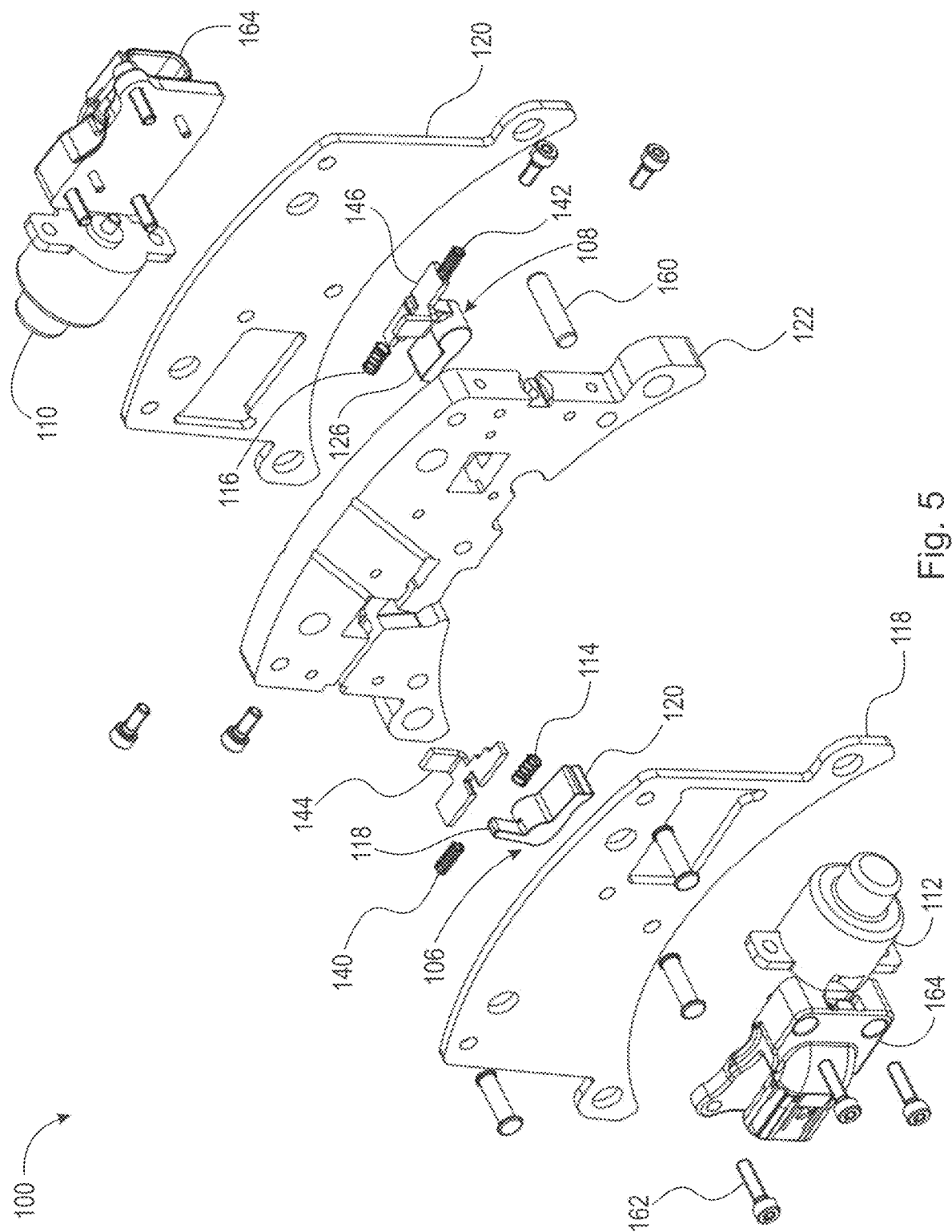
FIG. 5 is a front exploded view of the four-mode rocker clutch shown in FIG. 3.

FIG. 5 is a front exploded view of four-mode rocker clutch 100 shown in FIG. 3. The following should be viewed in light of FIGS. 1 through 5. In the example of FIG. 1, four-mode rocker clutch 100 includes: clutch gear 102 supported for rotation around axis of rotation AR; housing 104; pawl 106; pawl 108; actuator 110; actuator 112; resilient element 114 located within housing 104; and resilient element 116 located within housing 104.

Figure 6:
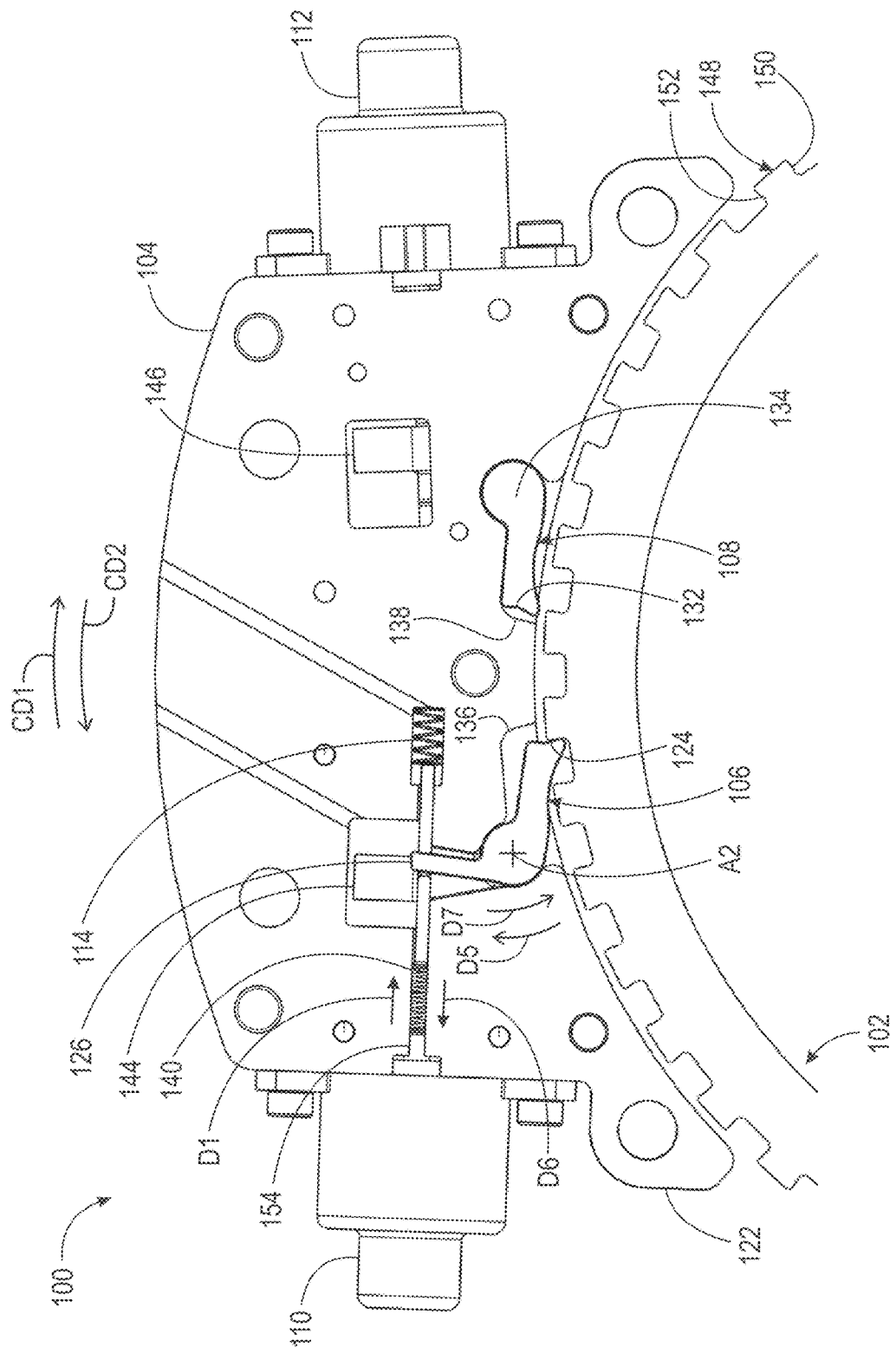
FIG. 6 is a front view of the four-mode rocker clutch shown FIG. 1 with a side panel removed.

FIG. 6 is a front view of four-mode rocker clutch 100 shown FIG. 1 with a side panel removed.

Figure 7:
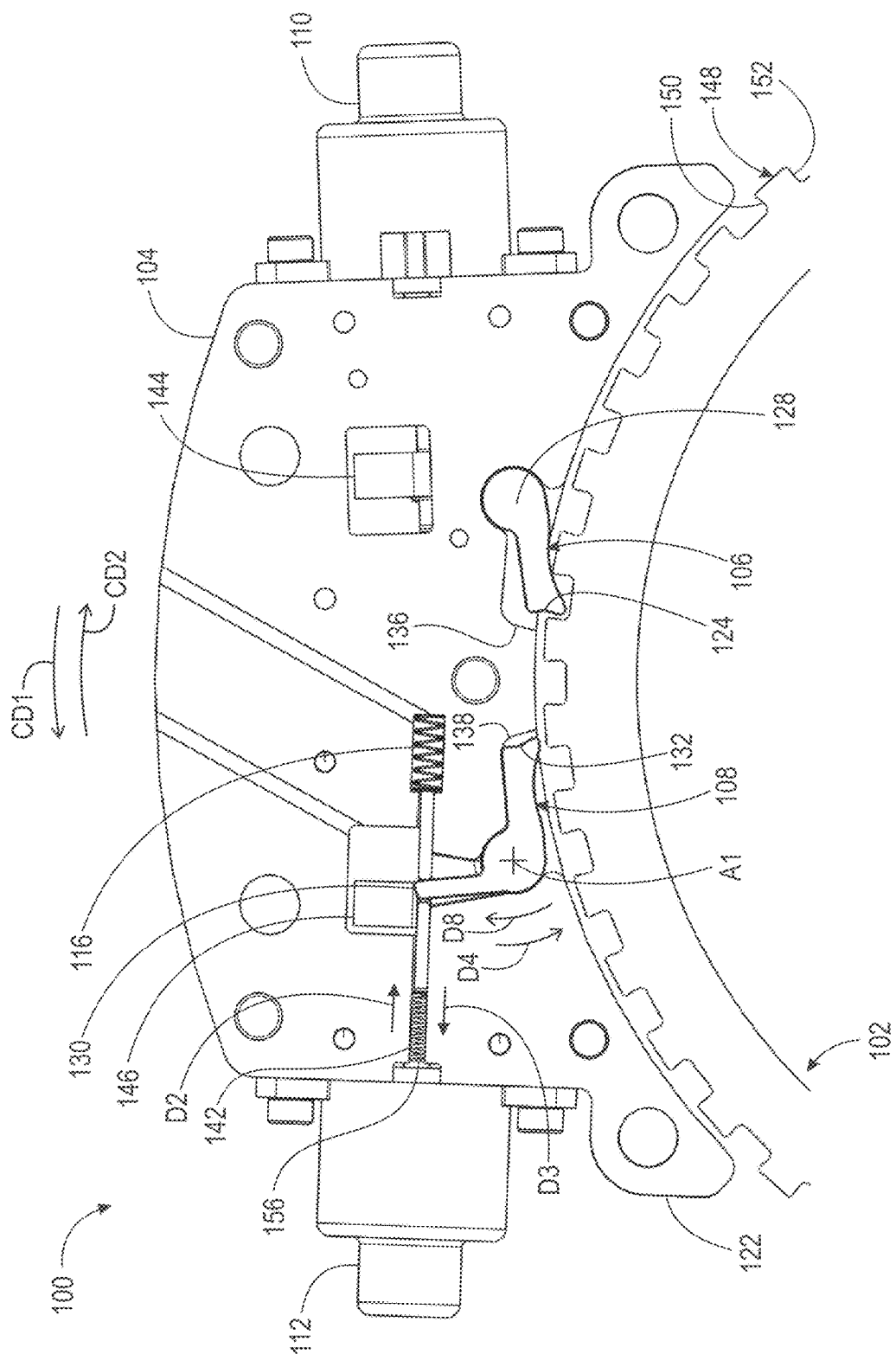
FIG. 7 is a rear view of the four-mode rocker clutch shown FIG. 1 with a side panel removed.

FIG. 7 is a rear view of four-mode rocker clutch 100 shown FIG. 1 with a side panel removed. The following should be viewed in light of FIGS. 1 through 7. In the example of FIG. 1, housing 104 includes side panels 118 and 120 and center panel 122, Pawl 106 includes end 124, end 126, and portion 128. Pawl 108 includes end 130, end 132, and portion 134. End 126 and portion 128 are disposed in cavity 136 bounded by housing 104. End 130 and portion 134 are disposed in cavity 138 bounded by housing 104.

In the clock-wise one-way mode rotation of clutch gear 102, with respect to housing 104, in circumferential direction CD1 is enabled. In the clock-wise one-way mode: actuator 110 is arranged to hold pawl 106 in contact with clutch gear 102; pawl 106 is arranged to block rotation of clutch gear 102, with respect to housing 104, in circumferential direction CD2; and resilient element 116 is arranged to hold pawl 108 out of contact with clutch gear 102.

Figure 8:
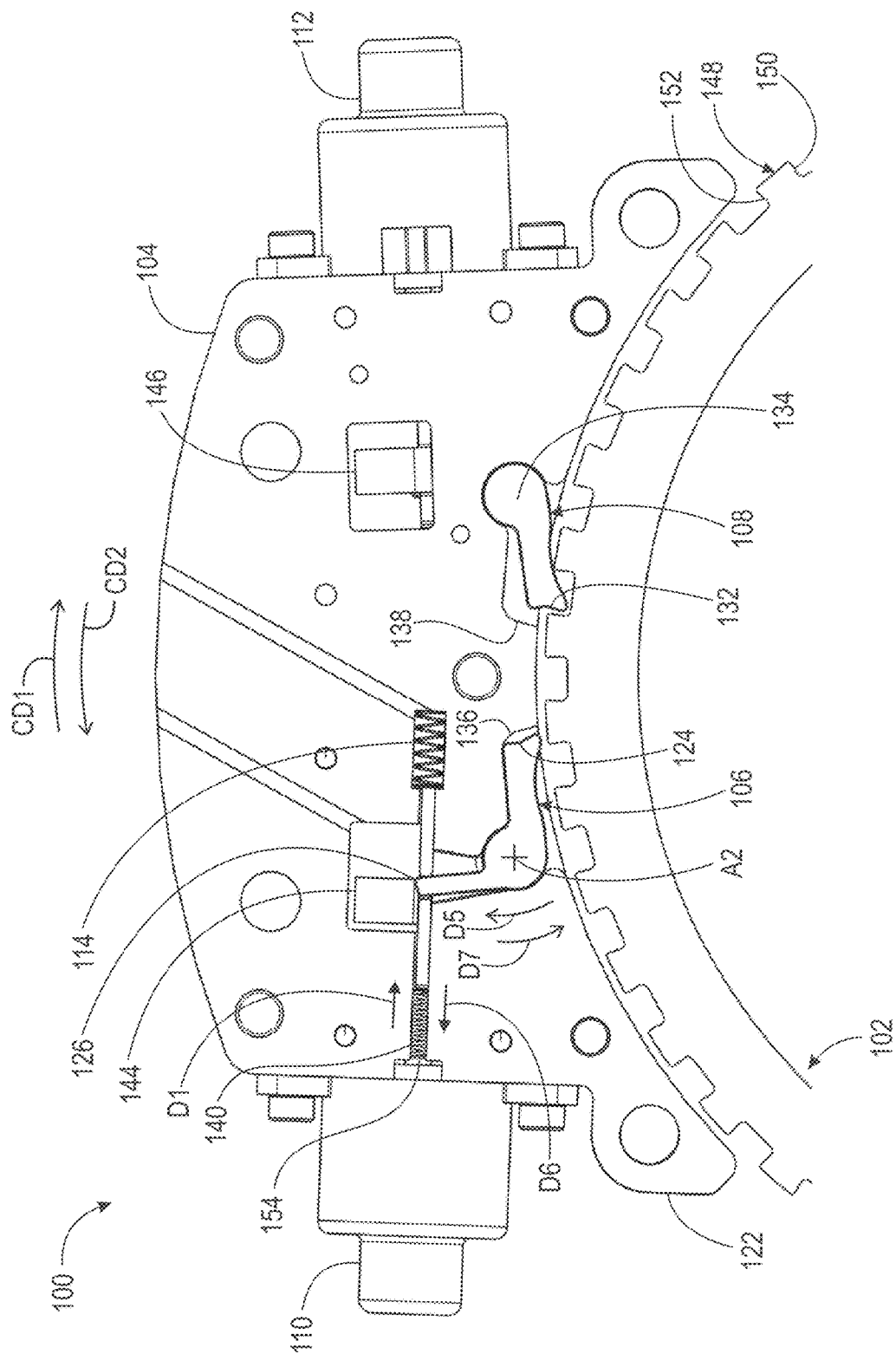
FIG. 8 is a front view of the four-mode rocker clutch FIG. 1 in a counter clock-wise one-way mode, with the side panel removed.

FIG. 8 is a front view of four-mode rocker clutch 100 shown FIG. 1 in a counter clock-wise one-way mode, with side panel 118 removed.

Figure 9:
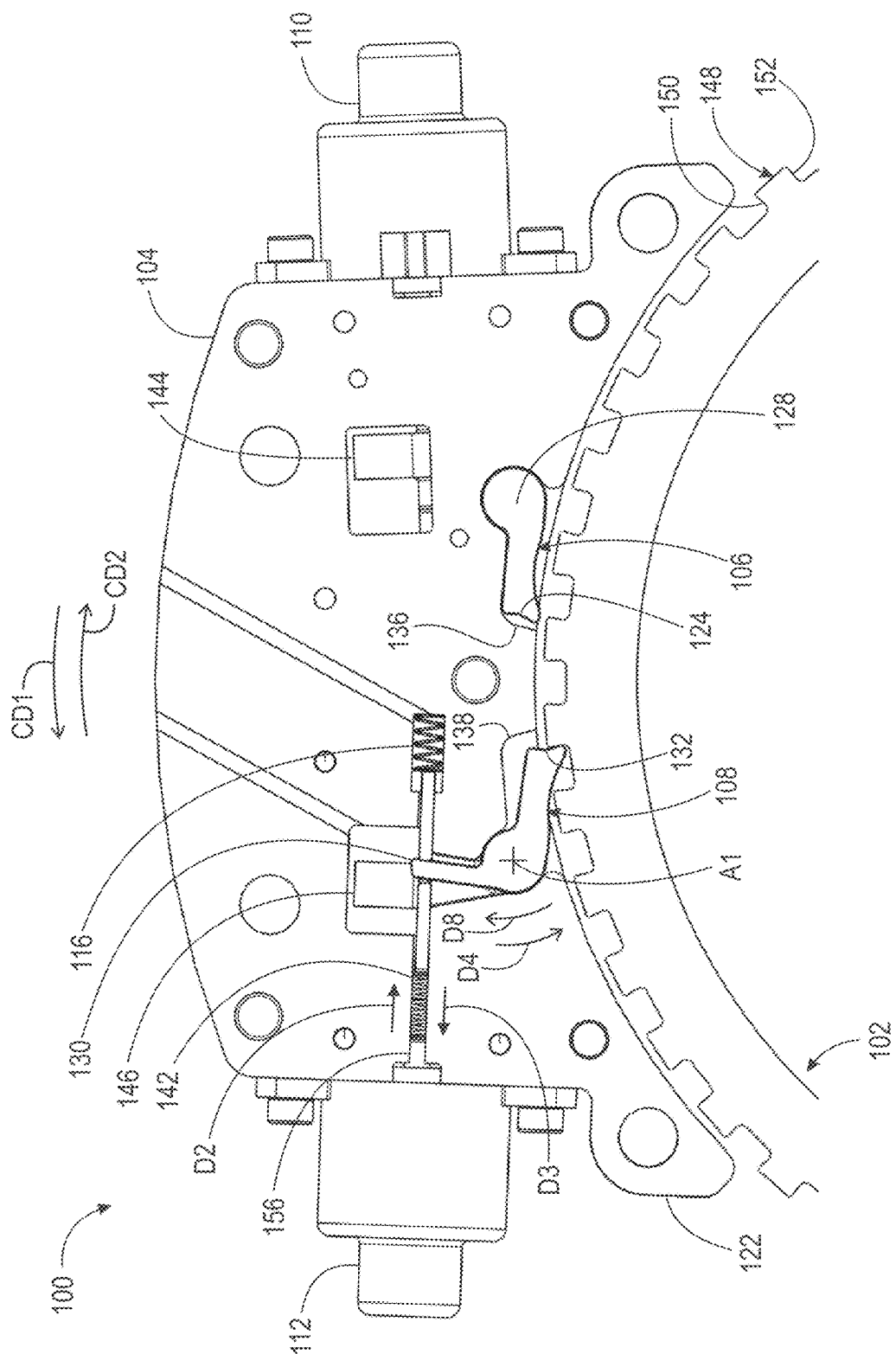
FIG. 9 is a rear view of the four-mode rocker clutch shown FIG. 8 with the side panel removed.

FIG. 9 is a rear view of four-mode rocker clutch 100 shown FIG. 8 with side panel 120 removed. The following should be viewed in light of FIGS. 1 through 9. In the counter clock-wise one-way mode, rotation of clutch gear 102, with respect to housing 104, in circumferential direction CD2 is enabled. In the counter clock-wise one-way mode: actuator 112 is arranged to hold pawl 108 in contact with clutch gear 102; pawl 108 is arranged to block rotation of clutch gear 102, with respect to housing 104, in circumferential direction CD1; and resilient element 114 is arranged to hold pawl 106 out of contact with clutch gear 102.

In the example of FIG. 1, four-mode rocker clutch 100 includes: resilient element 140; resilient element 142; shuttle link 144; and shuttle line 146, all of which are located within housing 104. Shuttle link 144 is directly engaged with: end 126 of pawl 106; and resilient elements 114 and 140. Shuttle link 146 is directly engaged with: end 130 of pawl 108; and resilient elements 116 and 142. By "directly engaged with" we mean the shuttle link and the resilient elements are in direct contact or are each in direct contact with mechanically solid components, such as a caps, located between the shuttle link and the resilient elements.

In the example of FIG. 1, clutch gear 102 includes teeth 148. Each tooth 148 includes surface 150 facing in circumferential direction CD1 and surface 152 facing in circumferential direction CD2. In the example of FIG. 1, actuators 110 and 112 are each a solenoid with pin 154 and pin 156, respectively. In the clock-wise one-way mode, solenoid 110 is energized to displace pin 154 in direction D1 and solenoid 112 is de-energized. In the counter clock-wise one-way mode, solenoid 112 is energized to displace pin 156 in direction D2 and solenoid 110 is de-energized.

To shift from the counter clock-wise one-way mode to the clock-wise one-way mode: actuator 112 is de-energized; resilient element 116 displaces shuttle link 146 in direction D3; shuttle link 146 displaces resilient element 142 and pin 156 in direction D3, and pivots pawl 108 in direction D4 around pivot axis A1 of pawl 108; end 132 of pawl 108 pivots out of contact with clutch gear 102, in particular with a surface 150; actuator 110 is energized to displace pin 154 in direction D1; pin 154 displaces resilient element 140 in direction D1; resilient element 140 displaces shuttle link 144 in direction D1; shuttle link 144 compresses resilient element 114 and pivots pawl 106 in direction D5 around pivot axis A2 of pawl 106; end 124 pivots into contact with clutch gear 154, in particular a surface 152 to block rotation of clutch gear 102, with respect to housing 104, in circumferential direction CD2.

To shift from the clock-wise one-way mode to the counter clock-wise one-way mode: actuator 110 is de-energized; resilient element 114 displaces shuttle link 144 in direction D6; shuttle link 144 displaces resilient element 140 and pin 154 in direction D6, and pivots pawl 106 in direction D7 around pivot axis A2; end 124 of pawl 106 pivots out of contact with clutch gear 102, in particular with a surface 152; actuator 112 is energized to displace pin 156 in direction D2; pin 156 displaces resilient element 142 in direction D2; resilient element 142 displaces shuttle link 146 in direction D2; shuttle link 146 compresses resilient element 116 and pivots pawl 108 in direction D8 around pivot axis A1 of pawl 108; end 132 pivots into contact with clutch gear 154, in particular a surface 150 to block rotation of clutch gear 102, with respect to housing 104, in circumferential direction CD1.

Figure 10:
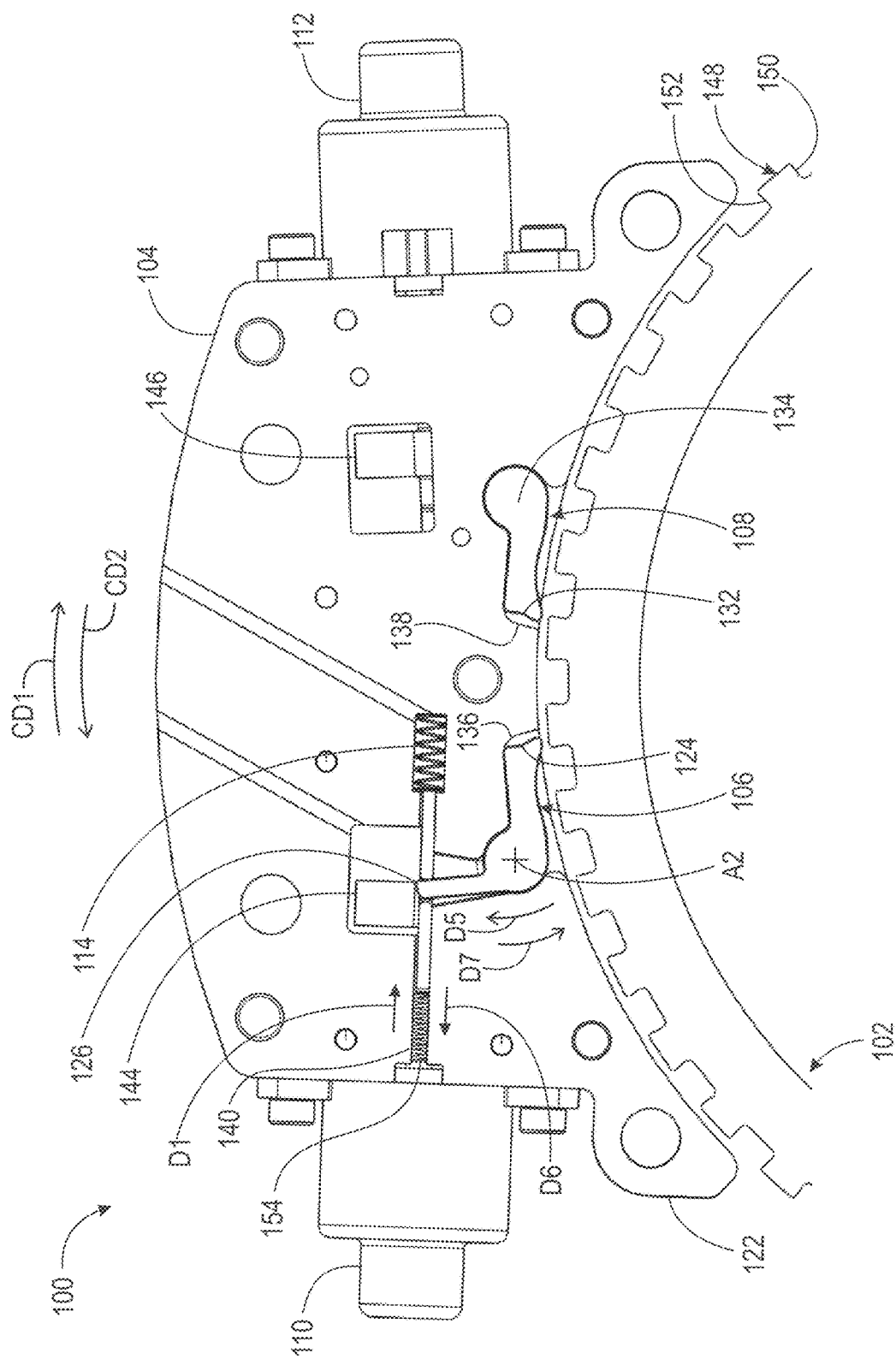
FIG. 10 is a front view of the four-mode rocker clutch shown FIG. 1 in a disconnect mode, with the side panel removed.

FIG. 10 is a front view of four-mode rocker clutch 100 shown FIG. 1 in a disconnect mode, with side panel 118 removed.

Figure 11:
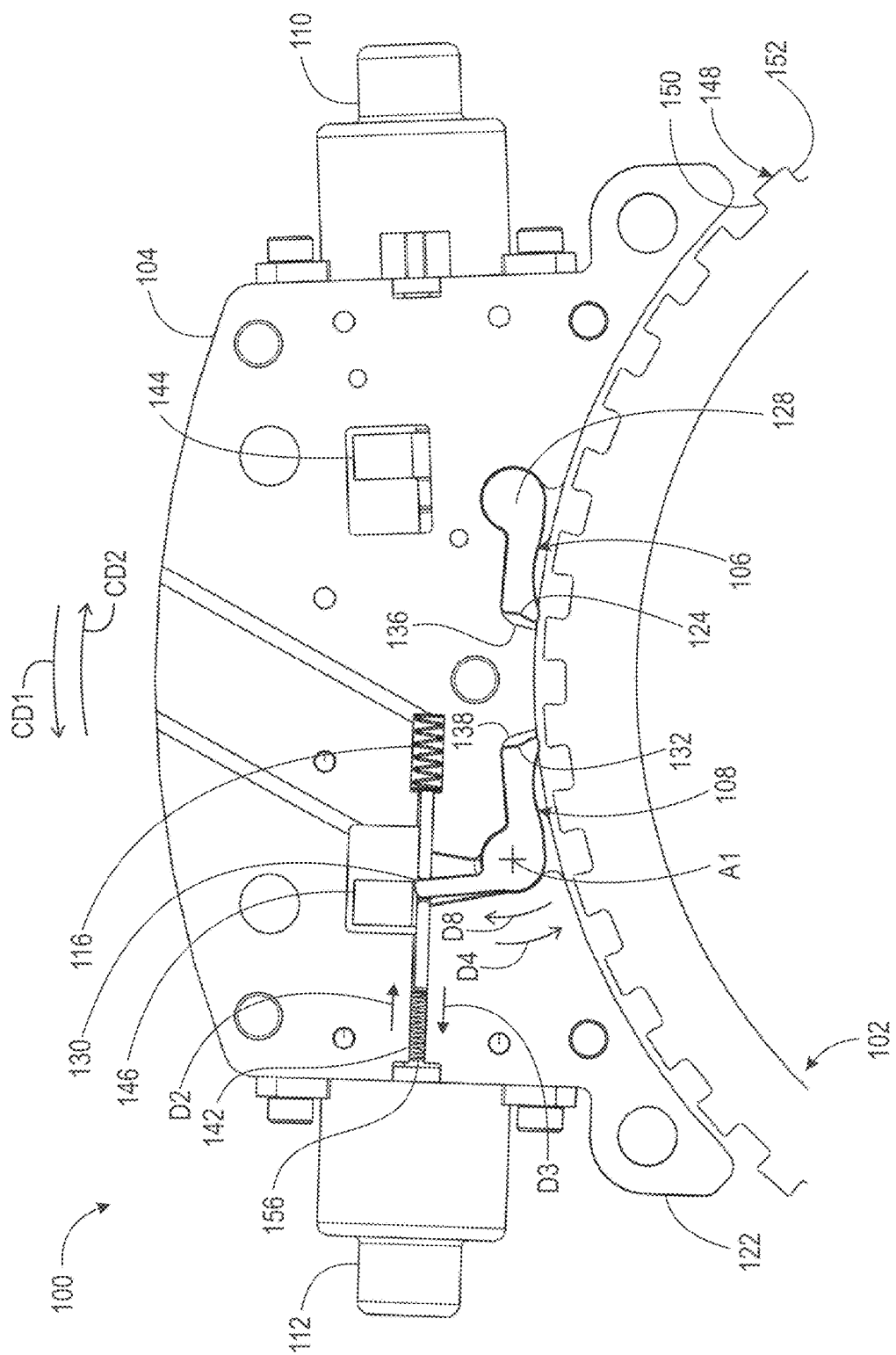
FIG. 11 is a rear view of the four-mode rocker clutch shown FIG. 10 with the side panel removed.

FIG. 11 is a rear view of four-mode rocker clutch 100 shown FIG. 10 with side panel 120 removed. The following should be viewed in light of FIGS. 1 through 11. In the disconnect mode: resilient element 114 is arranged to hold pawl 106 out of contact with clutch gear 102; and resilient element 116 is arranged to hold pawl 108 out of contact with clutch gear 102.

To shift from the clockwise one-way mode to the disconnect mode: actuator 110 is de-energized; resilient element 114 displaces shuttle link 144 in direction D6; shuttle link 144 displaces resilient element 140 and pin 154 in direction D6, and pivots pawl 106 in direction D7 around pivot axis A2; end 124 of pawl 106 pivots out of contact with clutch gear 102, in particular with a surface 152. To shift from the counter clock-wise one-way mode to the disconnect mode: actuator 112 is de-energized; resilient element 116 displaces shuttle link 146 in direction D3; shuttle link 146 displaces resilient element 142 and pin 156 in direction D3, and pivots pawl 108 in direction D4 around pivot axis A1 of pawl 108; end 132 of pawl 108 pivots out of contact with clutch gear 102, in particular with a surface 150.

To shift from the disconnect mode to the clockwise one-way mode: actuator 110 is energized to displace pin 154 in direction D1; pin 154 displaces resilient element 140 in direction D1; resilient element 140 displaces shuttle link 144 in direction D1; shuttle link 144 compresses resilient element 114 and pivots pawl 106 in direction D5 around pivot axis A2 of pawl 106; end 124 pivots into contact with clutch gear 154, in particular a surface 152 to block rotation of clutch gear 102, with respect to housing 104, in circumferential direction CD2. To shift from the disconnect mode to the counter clock-wise mode: actuator 112 is energized to displace pin 156 in direction D2; pin 156 displaces resilient element 142 in direction D2; resilient element 142 displaces shuttle link 146 in direction D2; shuttle link 146 compresses resilient element 116 and pivots pawl 108 in direction D8 around pivot axis A1 of pawl 108; end 132 pivots into contact with clutch gear 154, in particular a surface 150 to block rotation of clutch gear 102, with respect to housing 104, in circumferential direction CD1.

Figure 12:
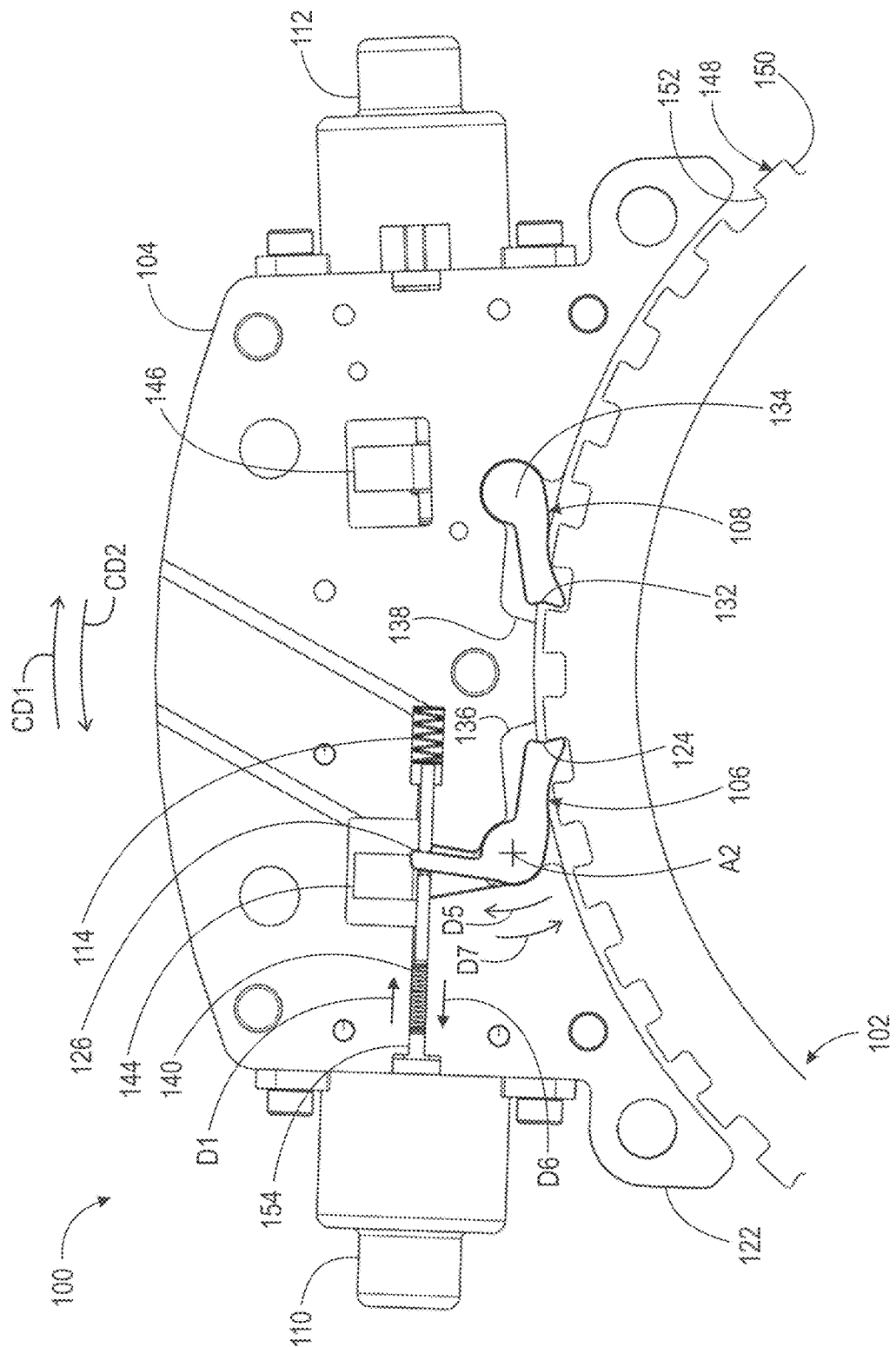
FIG. 12 is a front view of the four-mode rocker clutch shown FIG. 1 in a locked mode, with the side panel removed.

FIG. 12 is a front view of four-mode rocker clutch 100 shown FIG. 1 in a locked mode, with side panel 118 removed.

Figure 13:
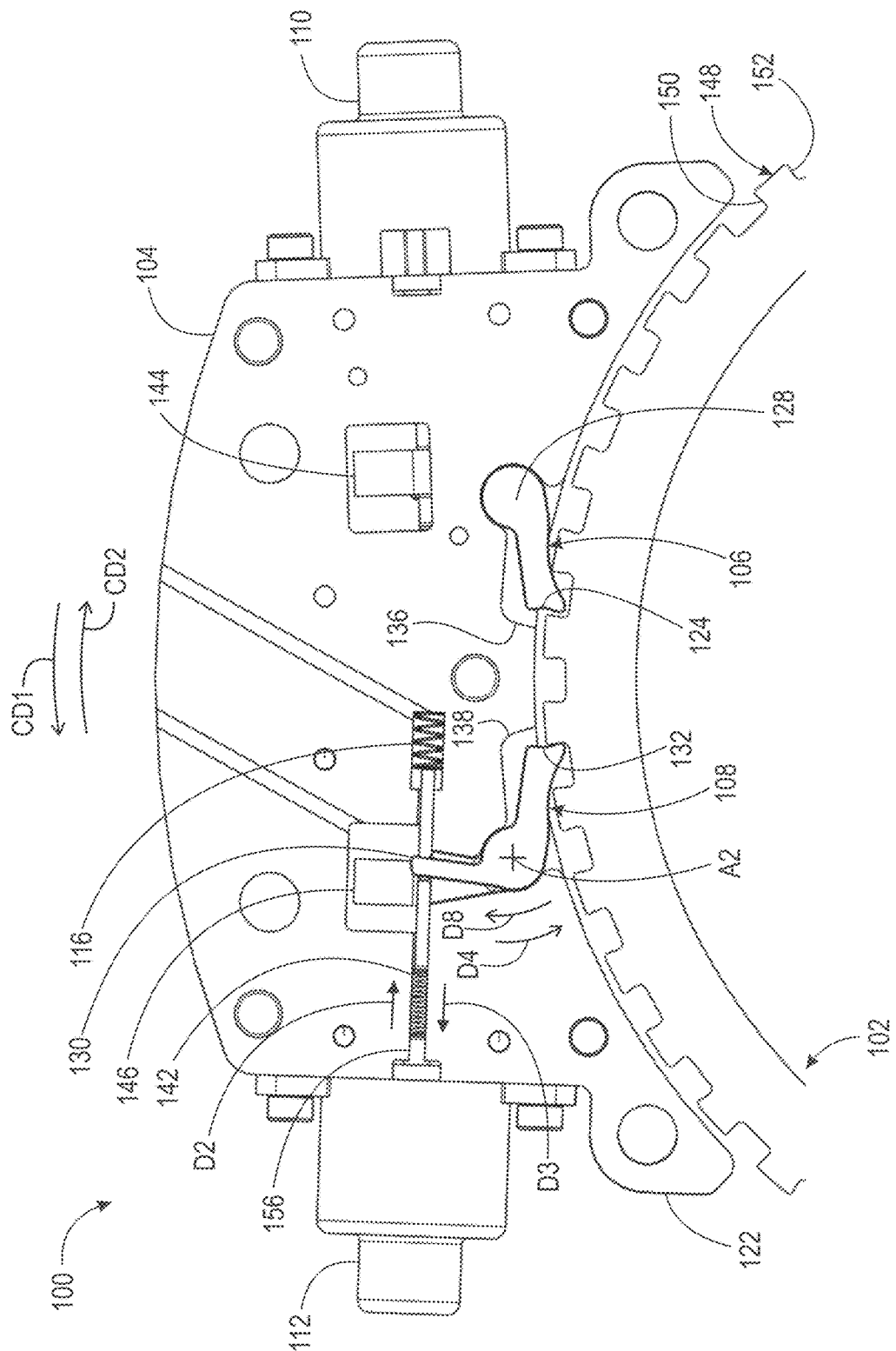
FIG. 13 is a rear view of the four-mode rocker clutch shown FIG. 12 with the side panel removed.

FIG. 13 is a rear view of four-mode rocker clutch 100 shown FIG. 12 with side panel 120 removed. The following should be viewed in light of FIGS. 1 through 13. For the locked mode: actuator 110 is arranged to hold pawl 106 in contact with clutch gear 102; pawl 106 is arranged to block rotation of clutch gear 102, with respect to housing 104, in circumferential direction CD2; actuator 112 is arranged to hold pawl 108 in contact with clutch gear 102; and pawl 108 is arranged to block rotation of clutch gear 102, with respect to housing 104 in circumferential direction CD1.

To shift from the clockwise one-way mode to the locked mode: actuator 112 is energized; actuator 112 displaces pin 156 in direction D2; pin 156 displaces resilient element 142 in direction D2; resilient element 142 displaces shuttle link 146 in direction D2; shuttle link 146 compresses resilient element 116 and pivots pawl 108 in direction D8 around axis A1; and end 132 of pawl 108 pivots into contact with gear 102, in particular with a surface 150.

To shift from the counter clockwise one-way mode to the locked mode: actuator 110 is energized; actuator 110 displaces pin 154 in direction D1; pin 154 displaces resilient element 140 in direction D1; resilient element 140 displaces shuttle link 144 in direction D1; shuttle link 144 compresses resilient element 114 and pivots pawl 106 in direction D5 around axis A2; and end 124 of pawl 106 pivots into contact with gear 102, in particular with a surface 152.

To shift from the locked mode to the clockwise one-way mode: actuator 112 is de-energized; resilient element 116 displaces shuttle link 146 in direction D3; shuttle link 146 displaces resilient element 142 and pin 156 in direction D3, and pivots pawl 108 in direction D4 around pivot axis A1 of pawl 108; end 132 of pawl 108 pivots out of contact with clutch gear 102, in particular with a surface 150. To shift from the locked mode to the counter clock-wise mode: actuator 110 is de-energized; resilient element 114 displaces shuttle link 144 in direction D6; shuttle link 144 displaces resilient element 140 and pin 154 in direction D6, and pivots pawl 106 in direction D7 around pivot axis A2; end 124 of pawl 106 pivots out of contact with clutch gear 102 in particular with a surface 152.

To shift from the locked mode to the disconnect mode: actuator 110 is de-energized; resilient element 114 displaces shuttle link 144 in direction D6; shuttle link 144 displaces resilient element 140 and pin 154 in direction D6, and pivots pawl 106 in direction D7 around pivot axis A2; end 124 of pawl 106 pivots out of contact with clutch gear 102, in particular with a surface 152; actuator 112 is de-energized; resilient element 116 displaces shuttle link 146 in direction D3; shuttle link 146 displaces resilient element 142 and pin 156 in direction D3, and pivots pawl 108 in direction D4 around pivot axis A1 of pawl 108; and end 132 of pawl 108 pivots out of contact with clutch gear 102, in particular with a surface 150.

To shift from the disconnect mode to the locked mode: actuator 110 is energized to displace pin 154 in direction D1; pin 154 displaces resilient element 140 in direction D1; resilient element 140 displaces shuttle link 144 in direction D1; shuttle link 144 compresses resilient element 114 and pivots pawl 106 in direction D5 around pivot axis A2 of pawl 106; end 124 pivots into contact with clutch gear 102, in particular a surface 152 to block rotation of clutch gear 102, with respect to housing 104, in circumferential direction CD2; actuator 112 is energized to displace pin 156 in direction D2; pin 156 displaces resilient element 142 in direction D2; resilient element 142 displaces shuttle link 146 in direction D2; shuttle link 146 compresses resilient element 116 and pivots pawl 108 in direction D8 around pivot axis A1 of pawl 108; and end 132 pivots into contact with clutch gear 154, in particular a surface 150 to block rotation of clutch gear 102, with respect to housing 104, in circumferential direction CD1.

Figure 14:
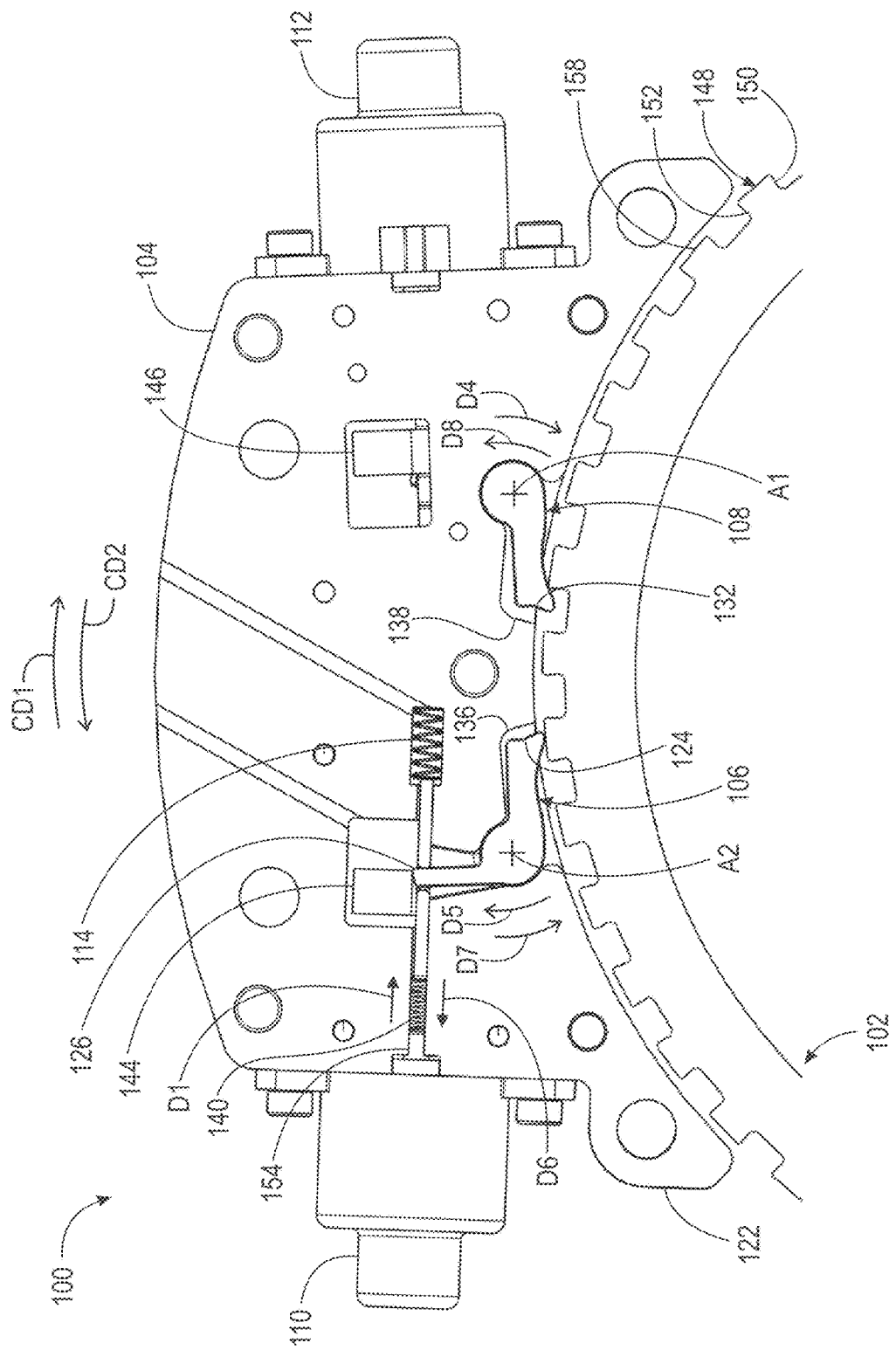
FIG. 14 is a front view of the four-mode rocker clutch shown FIG. 1 in a process of shifting between modes, with the side panel removed.

FIG. 14 is a front view of four-mode rocker clutch 100 shown FIG. 1 in a process of shifting between modes, with side panel 118 removed. The following should be viewed in light of FIGS. 1 through 14. The following are possible scenarios illustrated by FIG. 14. It is understood that other scenarios are possible for four-mode rocker clutch 100.

1. Scenario one: Four-mode rocker clutch 100 was operating in the counter clock-wise one-way mode with clutch gear 102 rotating in circumferential direction CD2, and a shift to the clock-wise one-way mode has been initiated, Actuator 110 is activated to begin pivoting pawl 106 in direction D5, actuator 112 is de-energized and resilient element 116 begins to pivot pawl 108 in direction D4. As clutch gear 102 begins to rotate in circumferential direction CD1, pawl 106 breaks contact with surface 150 of a tooth 148 and contacts outer surface 158 of a tooth 148. As clutch gear 102 continues to rotate in circumferential direction CD1: pawl 106 drops into contact with surface 152 of a tooth 148; and pawl 108 pivots in direction D4 to clear clutch gear 102.
2. Scenario one: Four-mode rocker clutch 100 was operating in the clock-wise one-way mode with clutch gear 102 rotating in circumferential direction CD1, and a shift to the counter clock-wise one-way mode has been initiated and. Actuator 112 is activated to begin pivoting pawl 108 in direction D8. Actuator 110 is de-energized and resilient element 114 begins to pivot pawl 106 in direction D7. As clutch gear 102 begins to rotate in circumferential direction CD2: pawl 106 begins to lift off clutch gear 102 and contacts outer surface 158 of a tooth 148; and pawl 108 drops into contact with a tooth 148. As clutch gear 102 continues to rotate in circumferential direction CD2: pawl 108 drops into contact with surface 150 of a tooth 148; and pawl 106 pivots in direction D7 to clear clutch gear 102.

In the example of FIG. 1, four-mode rocker clutch 100 includes: alignment pins 160 arranged to mount clutch 100, for example to a fixed component of a transmission (not shown); pins 162 connecting panels 118, 120, and 122; and solenoid position sensor 164.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

A1 axis, pawl 108
A2 axis, pawl 106
AR axis of rotation

CD1 circumferential direction
CD2 circumferential direction
D1 direction, actuator 110
D2 direction, actuator 112
D3 direction, actuator 112
D4 direction, axis A1
D5 direction, axis A2
D6 direction, actuator 110
D7 direction, axis AZ
D8 direction, axis A1
100 four-mode rocker clutch
102 clutch gear
104 housing
106 pawl
108 pawl
110 actuator
112 actuator
114 resilient dement
116 resilient dement
118 side panel
120 side panel
122 center panel
124 end, pawl
126 end, pawl
128 portion, pawl
130 end, pawl
132 end, pawl
134 portion, pawl
136 cavity
138 cavity
140 resilient element
142 resilient element
144 shuttle link
146 shuttle link
148 tooth
150 surface, tooth
152 surface, tooth
154 pin
156 pin
158 outer surface, tooth
160 alignment pin
162 pin
164 solenoid position sensor

The invention claimed is:

1. A four-mode rocker clutch, comprising:
   a clutch gear supported for rotation around an axis of rotation;
   a housing;
   a first pawl including a portion disposed within the housing;
   a first actuator;
   a second pawl including a portion disposed within the housing;
   a first resilient element; and
   a first shuttle link disposed within the housing in contact with the second pawl and with the first resilient element to actuate the second pawl, wherein for a first one-way mode of the four-mode rocker clutch:
      the first actuator is arranged to hold the first pawl in contact with the clutch gear;
      the first pawl is arranged to block rotation of the clutch gear, with respect to the housing, in a first circumferential direction around an axis of rotation; and,
      the first resilient element is arranged to hold the second pawl out of contact with the clutch gear.

2. The four-mode rocker clutch of claim 1, further comprising:
   a second actuator; and,
   a second resilient element, wherein:
      for a second one-way mode of the four-mode rocker clutch:
         the second resilient element is arranged to hold the first pawl out of contact with the clutch gear;
         the second pawl is arranged to hold the second pawl in contact with the clutch gear; and,
         the second pawl is arranged to block rotation of the clutch gear, with respect to the housing, in a second circumferential direction, opposite the first circumferential direction; and
      to shift from the second one-way mode to the first one-way mode, the first resilient element is arranged to pivot the second pawl out of contact with clutch gear.

3. The four-mode rocker clutch of claim 2, wherein to shift from the second one-way mode to the first one-way mode:
   the first resilient element is arranged to displace the first shuttle link; and,
   the first shuttle link is arranged to pivot the second pawl out of contact with the clutch gear.

4. The four-mode rocker clutch of claim 1, further comprising:
   a second actuator; and,
   a second resilient element, wherein:
      for a second one-way mode of the four-mode rocker clutch:
         the second resilient element is arranged to hold the first pawl out of contact with the clutch gear;
         the second actuator is arranged to hold the second pawl in contact the clutch gear; and,
         the second pawl is arranged to block rotation of the clutch gear, with respect to the housing, in a second circumferential direction, opposite the first circumferential direction; and,
      to shift from the first one-way mode to the second one-way mode, the second actuator is arranged to pivot the second pawl into contact with the clutch gear.

5. The four-mode rocker clutch of claim 4, further comprising:
   a second shuttle link disposed within the housing and in contact with the first pawl,
   wherein to shift from the first one-way mode to the second one-way mode:
      the second actuator is arranged to displace the second shuttle link; and,
      the second shuttle link is arranged to pivot the first pawl into contact with the clutch gear.

6. The four-mode rocker clutch of claim 1, further comprising:
   a second actuator, wherein for a locked mode of the four-mode rocker clutch:
      the first actuator is arranged to hold the first pawl in contact with the clutch gear;
      the first pawl is arranged to block rotation of the clutch gear, with respect to the housing, in the first circumferential direction;
      the second actuator is arranged to hold the second pawl in contact with the clutch gear; and,
      the second pawl is arranged to block rotation of the clutch gear, with respect to the housing, in a second circumferential direction, opposite the first circumferential direction.

7. The four-mode rocker clutch of claim 6, wherein to shift from the locked mode to the first one-way mode, the first resilient element is arranged to pivot the second pawl out of contact with the clutch gear.

8. The four-mode rocker clutch of claim 6, wherein to shift from the first one-way mode to the locked mode, the second actuator is arranged to pivot the second pawl into contact with the clutch gear.

9. The four-mode rocker clutch of claim 1, further comprising:
a second resilient element, wherein for a disconnect mode of the four-mode rocker clutch:
the first resilient element is arranged to hold the second pawl out of contact with the clutch gear; and,
the second resilient element is arranged to hold the first pawl out of contact with the clutch gear.

10. The four-mode rocker clutch of claim 9, further comprising:
a second actuator, wherein to shift from the disconnect mode to a second one-way mode:
the second actuator is arranged to pivot the second pawl into contact with the clutch gear; and,
the second pawl is arranged to block rotation of the clutch gear, with respect to the housing, in a second circumferential direction, opposite the first circumferential direction.

11. The four-mode rocker clutch of claim 9, further comprising:
a second actuator, wherein:
for a locked mode of the four-mode rocker clutch:
the first actuator is arranged to hold the first pawl in contact with the clutch gear;
the first pawl is arranged to block rotation of the clutch gear, with respect to the housing, in the first circumferential direction;
the second actuator is arranged to hold the second pawl in contact with the clutch gear; and,
the second pawl is arranged to block rotation of the clutch gear, with respect to the housing, in a second circumferential direction, opposite the first circumferential direction; and,
to shift from the locked mode to the disconnect mode:
the first resilient element is arranged to pivot the second pawl out of contact with the clutch gear; and,
the second resilient element is arranged to pivot the first pawl out of contact with the clutch gear.

12. The four-mode rocker clutch of claim 11, wherein to shift from the disconnect mode to the locked mode:
the first actuator is arranged to pivot the first pawl into contact with the clutch gear; and,
the second actuator is arranged to pivot the second pawl into contact with the clutch gear.

13. The four-mode rocker clutch of claim 1, further comprising:
a second actuator; and,
a second resilient element, wherein:
for a second one-way mode of the four-mode rocker clutch, the second pawl is arranged to contact the clutch gear to block rotation of the clutch gear, with respect to the housing, in a second circumferential direction opposite, the first circumferential direction; and,
to shift from the second one-way mode to the first one-way mode, the first resilient element is arranged to compress the second resilient element and pivot the second pawl out of contact with the clutch gear.

14. The four-mode rocker clutch of claim 13, wherein to shift from the first one-way mode to the second one-way mode:
the second actuator is arranged to displace the second resilient element; and,
the second resilient element is arranged to compress the first resilient element and pivot the second pawl into contact with the clutch gear.

15. A four-mode rocker clutch, comprising:
a clutch gear supported for rotation around an axis of rotation;
a housing;
a first pawl including a first portion disposed within the housing;
a first actuator;
a first resilient element;
a second pawl including a second portion disposed within the housing;
a second actuator;
a second resilient element; and
a first shuttle link disposed within the housing in contact with the second pawl and with the first resilient element to actuate the second pawl; and
a second shuttle link disposed within the housing in contact with the first pawl and with the second resilient element to actuate the first pawl;
wherein:
for a first one-way mode of the four-mode rocker clutch:
the first actuator is arranged to hold the first pawl in contact with the clutch gear;
the first pawl is arranged to block rotation of the clutch gear, with respect to the housing, in a first circumferential direction; and,
the first resilient element is arranged to hold the second pawl out of contact with the clutch gear; and,
to shift to a second one-way mode of the four-mode rocker clutch:
the second actuator is arranged to pivot the second pawl into contact with the clutch gear;
the second pawl is arranged to block rotation of the clutch gear, with respect to the housing, in a second circumferential direction, opposite the first circumferential direction, and
the second resilient element is arranged to pivot the first pawl out of contact with the clutch gear.

16. The four-mode rocker clutch of claim 15, wherein to shift to a locked mode of the four-mode rocker clutch from the second one-way mode:
the first actuator is arranged to pivot the first pawl into contact with the clutch gear; and,
the first pawl is arranged to block rotation of the clutch gear, with respect to the housing, in the first circumferential direction.

17. The four-mode rocker clutch of claim 15, wherein:
in a locked mode of the four-mode rocker clutch:
the first actuator is arranged to hold the first pawl in contact with the clutch gear;
the first pawl is arranged to block rotation of the clutch gear, with respect to the housing, in the first circumferential direction;
the second actuator is arranged to hold the second pawl in contact with the clutch gear;
the second pawl is arranged to block rotation of the clutch gear, with respect to the housing, in the second circumferential direction; and, to shift from the locked mode to the second one-way mode, the second resilient element is arranged to pivot the first pawl out of contact with the clutch gear.

18. The four-mode rocker clutch of claim 15, wherein:
in a disconnect mode of the four-mode rocker clutch:
the first resilient element is arranged to hold the second pawl out of contact with the clutch gear; and,
the second resilient element is arranged to hold the first pawl out of contact with the clutch gear; and,
to shift from the first one-way mode to the disconnect mode, the second resilient element is arranged to pivot the first pawl out of contact with the clutch gear.

19. A method of operating a four-mode rocker clutch, the four-mode rocker clutch including a housing, a clutch gear, a first pawl with a portion within the housing, and a second pawl with a portion within the housing, a first shuttle link disposed within the housing and in contact with the second pawl and with a first resilient element, and a second shuttle link, the method comprising:
holding, with the first resilient element and the second shuttle link, the first pawl out of contact with the clutch gear;
holding, with a first actuator, the second pawl in contact with the clutch gear;
blocking, with the second pawl, rotation of the clutch gear, with respect to the housing, in a first circumferential direction around an axis of rotation;
rotating the clutch gear, with respect to the housing, in a second circumferential direction, opposite the first circumferential direction;
pivoting, with a second resilient element and the first shuttle link, the second pawl out of contact with the clutch gear;
pivoting with a second actuator, the first pawl into contact with the clutch gear;
rotating the clutch gear, with respect to the housing, in the second circumferential direction; and,
blocking, with the first pawl, rotation of the clutch gear, with respect to the housing, in the second circumferential direction.

20. The method of claim 19, further comprising:
pivoting, with the first actuator, the second pawl into contact with the clutch gear;
blocking, with the second pawl, rotation of the clutch gear, with respect to the housing, in the first circumferential direction;
pivoting, with the second resilient element, the second pawl out of contact with the clutch gear;
pivoting, with the first resilient element, the first pawl out of contact with the clutch gear;
rotating the clutch gear, with respect to the housing, in the first circumferential direction; and,
rotating the clutch gear, with respect to the housing, in the second circumferential direction.

* * * * *